United States Patent
Horiyama

(10) Patent No.: US 11,843,736 B2
(45) Date of Patent: Dec. 12, 2023

(54) IMAGE FORMING APPARATUS, CONTROL METHOD, AND STORAGE MEDIUM

(71) Applicant: CANON KABUSHIKI KAISHA, Tokyo (JP)

(72) Inventor: Jun Horiyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/189,047

(22) Filed: Mar. 23, 2023

(65) Prior Publication Data
US 2023/0308561 A1 Sep. 28, 2023

(30) Foreign Application Priority Data
Mar. 28, 2022 (JP) .................................. 2022-051121

(51) Int. Cl.
*H04N 1/00* (2006.01)

(52) U.S. Cl.
CPC ..... *H04N 1/00488* (2013.01); *H04N 1/00029* (2013.01); *H04N 1/00074* (2013.01); *H04N 1/00514* (2013.01)

(58) Field of Classification Search
CPC ............. H04N 1/0035; H04N 1/00405; H04N 1/00488; H04N 1/00029; H04N 1/00074; H04N 1/00514
USPC ................................................ 358/1.14, 1.15
See application file for complete search history.

(56) References Cited

U.S. PATENT DOCUMENTS

2019/0007567 A1\* 1/2019 Omori ................... G06F 3/0482
2020/0053238 A1\* 2/2020 Morioka ................. G06F 3/165

FOREIGN PATENT DOCUMENTS

JP 2006023637 A 1/2006

\* cited by examiner

*Primary Examiner* — Kent Yip
(74) *Attorney, Agent, or Firm* — Canon U.S.A., Inc. IP Division

(57) ABSTRACT

An image forming apparatus having a voice notification function of giving a voice notification to a user includes a first setting unit configured to set whether to enable the voice notification function of notifying the user of an operation result of the image forming apparatus in a case where the operation result is normal, and a second setting unit configured to set whether to enable the voice notification function relating to the operation result of the image forming apparatus in a case where the operation result is an error.

7 Claims, 6 Drawing Sheets

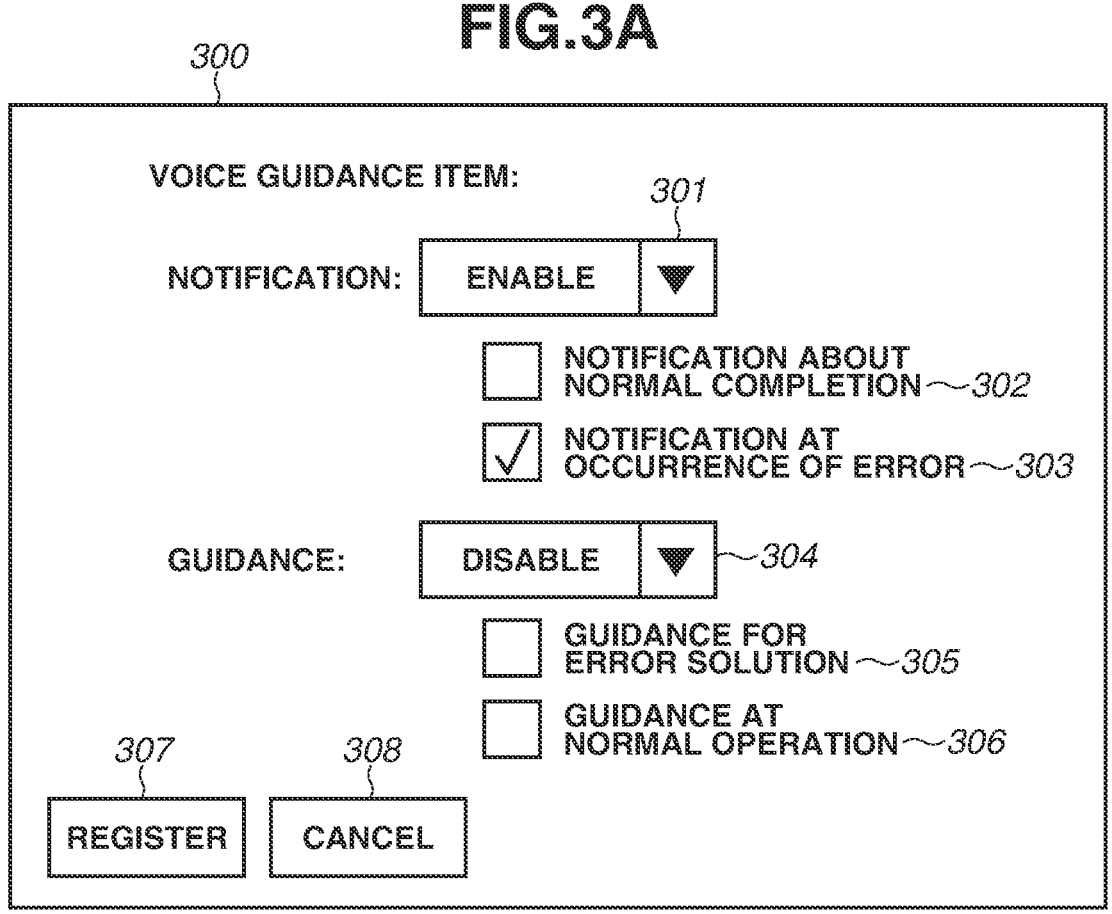
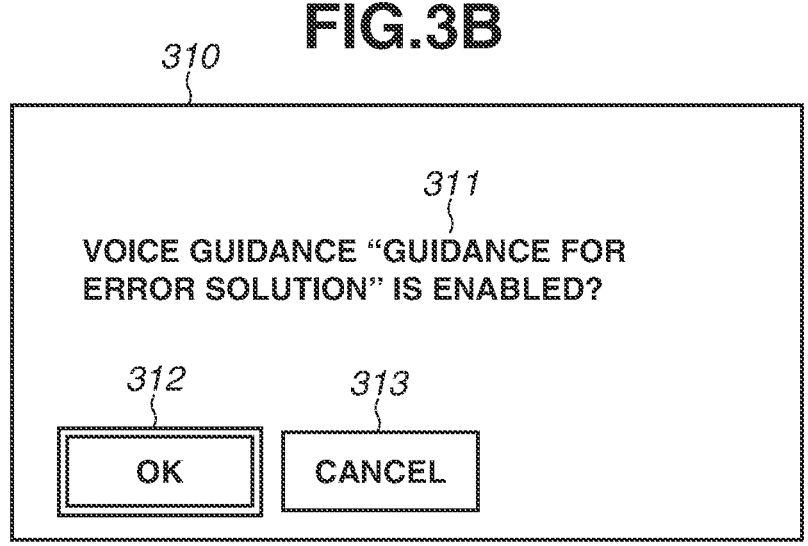

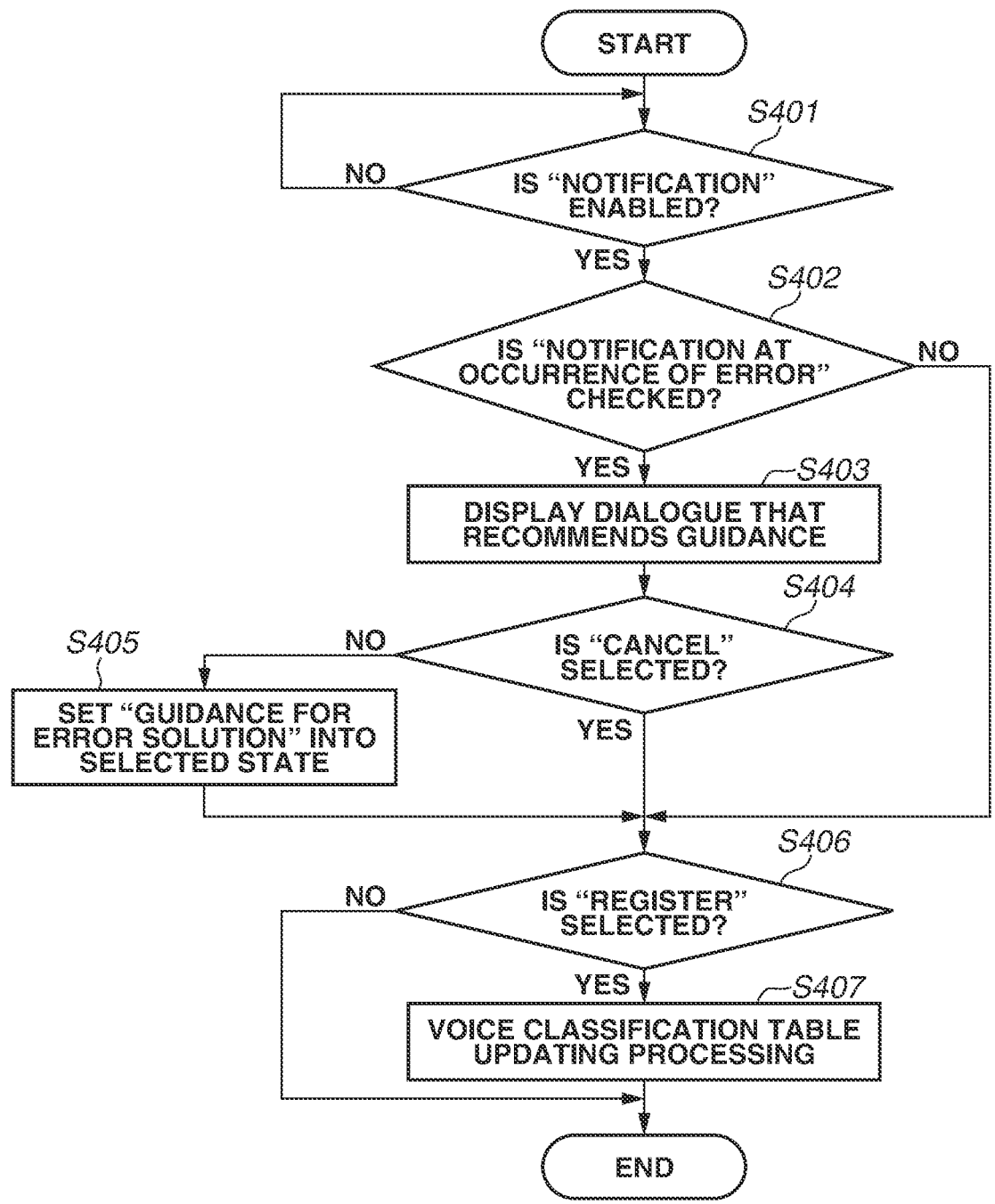

IMAGE FORMING APPARATUS, CONTROL METHOD, AND STORAGE MEDIUM

BACKGROUND OF THE DISCLOSURE

Field of the Disclosure

The present disclosure relates to an image forming apparatus that gives a voice notification to a user, a control method, and a storage medium.

Description of the Related Art

In recent years, image forming apparatuses having a function of providing some kind of information to a user by a sound such as voice guidance or a warning sound have been proposed. Japanese Patent Application Laid-Open No. 2006-23637 discusses an image forming apparatus that allows a user to set, as voice guidance, not only a normal response but also a short response that enables acquisition of information through voice guidance in a shorter time.

SUMMARY OF THE DISCLOSURE

According to an aspect of the present disclosure, an image forming apparatus having a voice notification function of giving a voice notification to a user includes a first setting unit configured to set whether to enable the voice notification function of notifying the user of an operation result of the image forming apparatus in a case where the operation result is normal, and a second setting unit configured to set whether to enable the voice notification function relating to the operation result of the image forming apparatus in a case where the operation result is an error.

Further features of the present disclosure will become apparent from the following description of exemplary embodiments with reference to the attached drawings.

BRIEF DESCRIPTION OF THE DRAWINGS

FIGS. 3A and 3B are diagrams illustrating user interfaces of the image forming apparatus according to a first exemplary embodiment.

FIG. 4 is a flowchart illustrating processing contents of the image forming apparatus according to the first exemplary embodiment.

DESCRIPTION OF THE EMBODIMENTS

With conventional voice guidance, a user is notified of operation results and the like of an image forming apparatus. The operation results include two types of results: normal and an error. However, the user may desire to be notified of an operation result of the image forming apparatus only in a case where the operation result is an error. Even in the above-described Japanese Patent Application Laid-Open No. 2006-23637, it is not assumed to individually set responses to a normal operation and an error operation of the image forming apparatus.

The present disclosure is, therefore, directed to making it possible to set whether to enable a voice notification function relating to an operation result of the image forming apparatus in each of the cases where the operation result is normal and an error.

<Hardware Configuration Example of Image Forming Apparatus>

Figure 1:
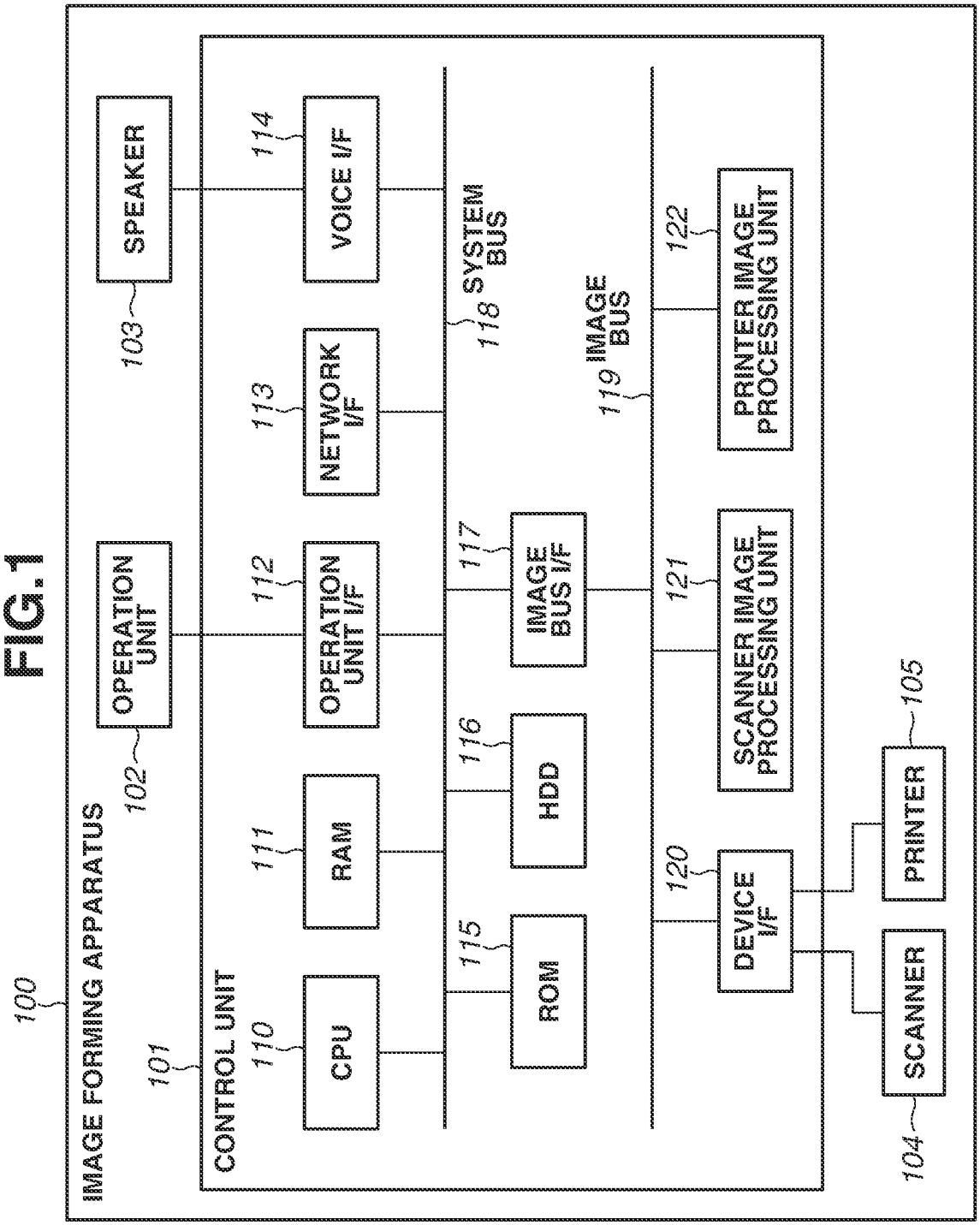
FIG. 1 is a diagram illustrating a hardware configuration of an image forming apparatus.

FIG. 1 is a diagram illustrating a configuration of an image forming apparatus 100 according to a first exemplary embodiment. The present exemplary embodiment describes voice guidance relating to an operation and the like of the image forming apparatus 100, but may be applied to voice guidance of electronic devices other than the image forming apparatus 100. Further, in the present exemplary embodiment, the voice guidance relating to an operation and the like of the image forming apparatus 100 is provided by the image forming apparatus 100 itself, but may be provided by another apparatus having a voice notification function. The image forming apparatus 100 includes a control unit 101, an operation unit 102, a speaker 103, a scanner 104, and a printer 105.

The control unit 101 includes a central processing unit (CPU) 110, a random access memory (RAM) 111, an operation unit interface (I/F) 112, a network I/F 113, and a voice I/F 114, as operation units and processing units of the speaker 103. The control unit 101 further includes a read only memory (ROM) 115, a hard disk drive (HDD) 116, an image bus I/F 117, and a system bus 118.

The control unit 101 further includes an image bus 119, a device I/F 120, a scanner image processing unit 121, and a printer image processing unit 122 as processing units relating to printing and scanning. Note that the scanner 104 and the scanner image processing unit 121 are provided as needed.

The CPU 110 is a controller that controls the entire control unit 101. The RAM 111 is a memory that temporarily stores image data and processing necessary for software operations.

The operation unit I/F 112 is an interface with the operation unit 102, and outputs image data to be displayed on the operation unit 102 to the operation unit 102. Further, the operation unit I/F 112 transmits information input by a user through the operation unit 102 to the CPU 110.

The network I/F 113 is an interface for transmitting and receiving a print job and various communication data of clients to and from, for example, a backbone network (not illustrated). Note that a network connectable with the network I/F 113 may be a wired network or a wireless network.

The voice I/F 114 is an interface with the speaker 103, and outputs voice data to be reproduced by the speaker 103 to the speaker 103.

The ROM 115, which is a boot ROM, stores a boot program of a system. The HDD 116, which is an external storage apparatus, stores software, image data, voice data, setting information, and the like.

The image bus I/F 117 is a bus bridge that connects the system bus 118 with the image bus 119 and converts data. The system bus 118 is a data exchange path shared among components configuring the control unit 101.

The image bus 119 is a path that is configured by a peripheral component interconnect (PCI) bus or an IEEE 1394 bus. Image data is transferred via the image bus 119 at high speed.

The device I/F 120 connects the control unit 101 with the scanner 104 and the printer 105 that are image input and output devices, and performs conversion between synchronous image data and asynchronous image data.

The scanner image processing unit 121 corrects, processes, and edits input image.

The printer image processing unit 122 corrects print output image data and converts the resolution of the print output image data in accordance with the performance of a printer.

Note that the hardware configuration illustrated in the drawing is one example, and addition or omission may be made on the configuration if necessary.

<Module Configuration Example of Software or the Like in Image Forming Apparatus>

Figure 2:
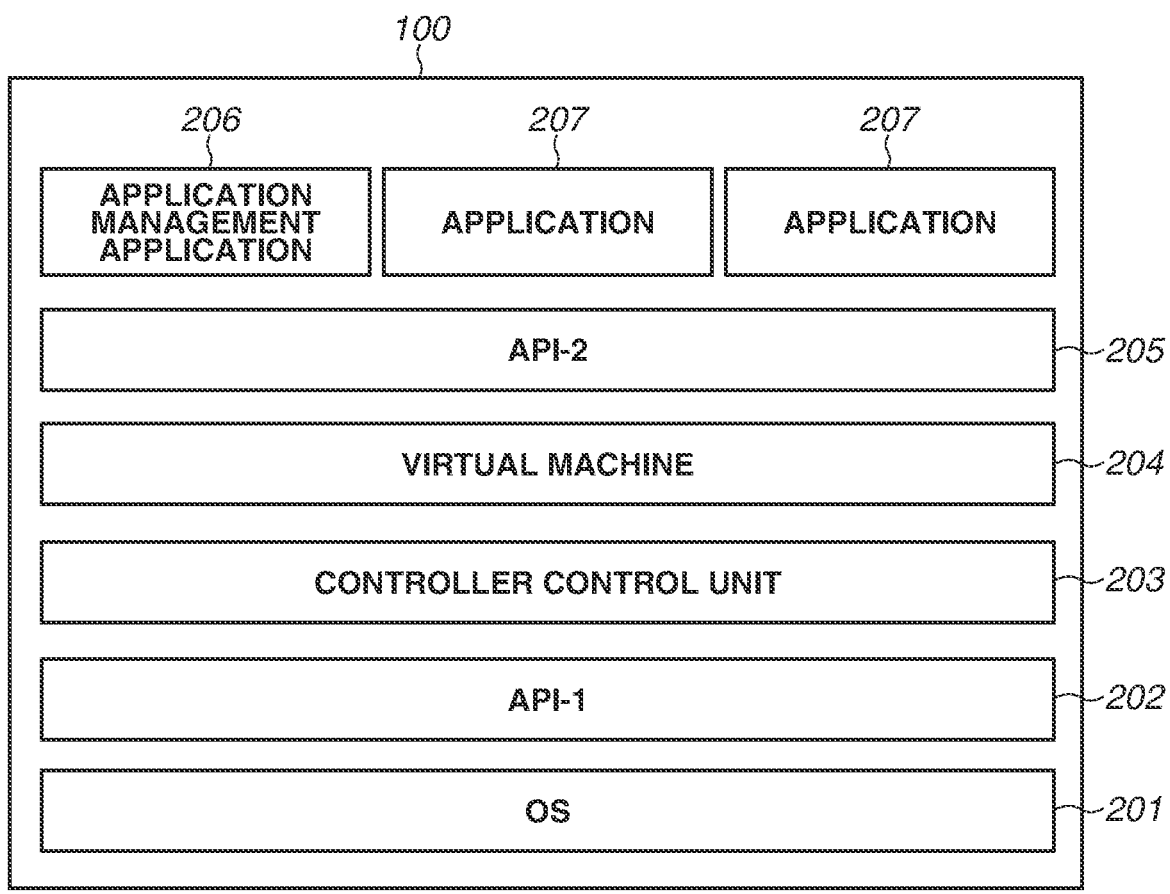
FIG. 2 is a diagram illustrating a software configuration of the image forming apparatus.

FIG. 2 is a module configuration diagram of software or the like in the image forming apparatus 100 according to the present exemplary embodiment. An operating system (OS) 201 manages and controls resources of the entire image forming apparatus 100.

An application programming interface-1 (API-1) 202 is an interface for an application that operates on the OS 201. The application can access to the resources on the image forming apparatus 100 and can causes the CPU 110 to execute a command via the API-1202. A controller control unit 203 operates on the OS 201 to control the scanner 104, the printer 105, the operation unit 102, and the speaker 103.

A virtual machine 204 provides an optimum execution environment for a specific application, and is achieved by, for example, a Java (registered trademark) virtual machine.

An API-2 205 is an interface via which an application executed on the virtual machine 204 uses the controller control unit 203 and the API-1 202. An application management application 206 manages an application executed on the virtual machine 204. The application management application 206 controls downloading, uploading, deleting, and enabling/disabling of an application to be described below. An application 207 is executed on the virtual machine 204. In this configuration, an arbitrary number applications 207 having arbitrary functions can be installed in the image forming apparatus 100 as appropriate, and can be executed. Further, the applications 207 can be installed in the image forming apparatus 100 in advance, and can be used in initial states. The applications 207 described here include applications, described below, that give a voice notification about an operation result to a user who uses the image forming apparatus 100 and give the user the voice guidance on usage (including a setting function to be displayed on the operation unit 102).

Further, the function of each application 207 is achieved by storing a corresponding program in the ROM 115 or the HDD 116, loading the program into the RAM 111 at activation of the image forming apparatus 100, and executing the program.

<Processing for Setting Voice Response>

FIG. 3A is a diagram illustrating an example of a user interface for registering settings of the voice response to be displayed on the operation unit 102 upon execution of the application 207 of the image forming apparatus 100 according to the present exemplary embodiment. A setting screen 300 of voice guidance items is displayed on the operation unit 102, and instructions for settings relating to the voice guidance is accepted from the user.

An icon 301 indicates that the user interface is for setting whether to enable or disable the function of notifying the user of a voice "notification" by the speaker 103. "Notification" here means a voice notification about an operation result or the like of the image forming apparatus 100. In a case where "enable" is selected on the icon 301, "Notification about normal completion (302)" and "Notification at occurrence of error (303)" can be individually set to be enabled or disabled. "Notification about normal completion (302)" in the image forming apparatus 100 means a voice response to the user, such as "Printing is completed" or "Copying is completed. Make sure to pick up the document". Further, "Notification at occurrence of error (303)" in the image forming apparatus 100 means a voice notification for notifying the user about occurrence of an error such as "Toner out" or "Print data is unauthorized".

An icon 304 indicates that the user interface is for setting whether to enable or disable a function of giving the user a voice notification "Guidance" by the speaker 103. "Guidance" here refers to a voice notification about an operating procedure or the like of the image forming apparatus 100. In a case where "enable" is selected on the icon 304, "Guidance for error solution (305)" and "Guidance at normal operation (306)" can further be individually set to be enabled or disabled. "Guidance for error solution (305)" in the image forming apparatus 100 means that a voice guidance on an error solution is given to the user when an error such as Toner Out or Paper Out occurs in the image forming apparatus 100. Further, "Guidance at normal operation (306)" in the image forming apparatus 100 means that a voice guidance on an operating procedure is given to the user if the procedure is complicated, even in the case where the image forming apparatus 100 operates normally. When the user presses down a register button 307, the contents set on the setting screen 300 are saved in a voice classification table, described below, and the setting screen 300 is closed. When the user presses down a cancel button 308, the setting screen 300 is closed without changing the contents of the voice classification table, described below.

"Notification at occurrence of error (303)" and "Guidance for error solution (305)" described above are highly associated with each other, and thus their settings are desirably performed in an associated manner. For example, when "Toner out" is notified in the image forming apparatus 100, it is desirable that "Replace Toner" is subsequently guided. Therefore, in a case where "Notification at occurrence of error (303)" is enabled, a dialogue 310 (selection screen) in FIG. 3B that prompts the user decide whether to enable "Guidance for error solution (305)" is displayed on the operation unit 102.

A message "Voice guidance 'Guidance for error solution' is enabled?" is displayed on a message display section 311 of the dialogue 310. When the user selects an OK button 312 of the dialogue 310, the icon 304, if indicating "disable", is changed to "enable", a check box of "Guidance for error solution (305)" is marked, and the dialogue 310 is closed. When the user selects a cancel button 313, the dialogue 310 is directly closed.

FIG. 4 is a flowchart illustrating the processing contents of the user interfaces in FIGS. 3A and 3B for setting "Notification at occurrence of error (303)" and "Guidance for error solution (305)" in a linked manner. In the processing in FIG. 4, the CPU 110 of the image forming apparatus 100 executes the application 207 having a voice guidance setting function. Further, the processing starts upon detection by the operation unit 102 that the user selects the voice guidance setting function (not illustrated) of the application 207. In step S401 of FIG. 4, the application 207 determines via the operation unit 102 whether the user enables the icon 301 for notification. In a case where the application 207 detects that the icon 301 for notification is enabled (YES in step S401), the processing proceeds to step S402. In step S402, the application 207 determines via the operation unit 102 whether the user marks the check box of "Notification at occurrence of error (303)" to enable the notification. In a case where the application 207 detects that the notification is enabled (YES in step S402), the processing proceeds to step S403. In step S403, the application 207 displays the dialogue 310 that prompts the user to determine whether to enable "Guidance for error solution (305)" on the operation unit 102. In step S404, the application 207 then determines via the operation unit 102 whether the user selects the OK button 312 or the cancel button 313 of the dialogue 310. In a case where the application 207 detects that the cancel button 313 is selected (YES in step S404), the application 207 ends the dialogue 310 and the processing proceeds to step S406. In a case where the application 207 detects that the OK button 312 is selected (NO in step S404), the application 207 ends the dialogue 310 and the processing proceeds to step S405. In step S405, the application 207 marks the check box of "Guidance for error solution (305)" to enable the setting. Subsequently, in step S406, the application 207 determines via the operation unit 102 whether the user selects the register button 307 or the cancel button 308 of the dialogue 300. In a case where the application 207 detects that the cancel button 308 is selected (YES in step S406), the application 207 closes the dialogue 300 to end the processing. In a case where the application 207 detects that the register button 307 is selected (NO in step S406), the application 207 closes the dialogue 300 and the processing proceeds to step S407. In step S407, the application 207 updates the voice classification table and ends the processing.

Table A is created by the application 207, and is an example of the voice classification table held in the HDD 116. In Table A, a processing result identification (ID) 1101 indicates a result of processing such as printing or copying performed by the image forming apparatus 100. Voice classification 1102 indicates voices related to processing results obtained by the image forming apparatus 100 and that are given to the user. A voice ID 1103 indicates IDs for associating a voice data table, described below, with the voice classification table. A processing type name 1104 indicates names of contents of the processing results obtained by the image forming apparatus 100. An enable/disable flag 1105 indicates whether voice data present in the voice data table, described below, is to be notified to the user in a case where the processing result obtained by the image forming apparatus 100 is in the processing result ID 1101.

The disable flag (voice data is not notified) is indicated by 0, and the enable flag (voice data is notified) is indicated by 1. Further, the enable/disable flag 1105 can be changed between enable and disable by the user interface 300 for registering the settings of the voice responses to be displayed by the application 207 as described with reference to the flowchart of FIG. 4.

TABLE A

| 1101 Processing result ID | 1102 Voice classification | 1103 Voice ID | 1104 Processing type name | 1105 Enable/disable flag |
|---|---|---|---|---|
| Voice Classification Table | | | | |
| 1 | Notification (normal completion) | 1 | Printing completion | 0 |

TABLE A-continued

| 1101 Processing result ID | 1102 Voice classification | 1103 Voice ID | 1104 Processing type name | 1105 Enable/disable flag |
|---|---|---|---|---|
| Voice Classification Table | | | | |
| 2 | Notification (occurrence of error) | 3 | Toner out | 1 |
| 3 | Notification (occurrence of error) | 4 | Unauthorized print data | 1 |
| 4 | Guidance (normal operation) | 6 | Detection of manual feed (A4) | 0 |
| 5 | Guidance (error solution) | 5 | Toner replenishment | 1 |
| ... | ... | ... | ... | ... |

Table B is created by the application 207, and shows one example of the voice data table held in the HDD 116. In Table B, a voice ID 1201 is for uniquely specifying voice data, and synchronizes with the voice ID 1103 in Table A. The application 207 converts contents of voice data 1202 via the voice I/F 114 into voices, and generates the voices from the speaker 103. A related voice ID 1203 indicates a related voice ID.

TABLE B

| 1201 Voice ID | 1202 Voice data | 1203 Related voice ID |
|---|---|---|
| Voice data table | | |
| 1 | Printing is completed. | |
| 2 | Copying is completed. Make sure to pick up the document. | |
| 3 | Toner is depleted. | 5 |
| 4 | Print data is unauthorized. | |
| 5 | Shake the toner bottle and add toner through the insertion opening. | 3 |
| 6 | A4 size is detected. Check the paper type. | |
| ... | ... | ... |

Figure 5:
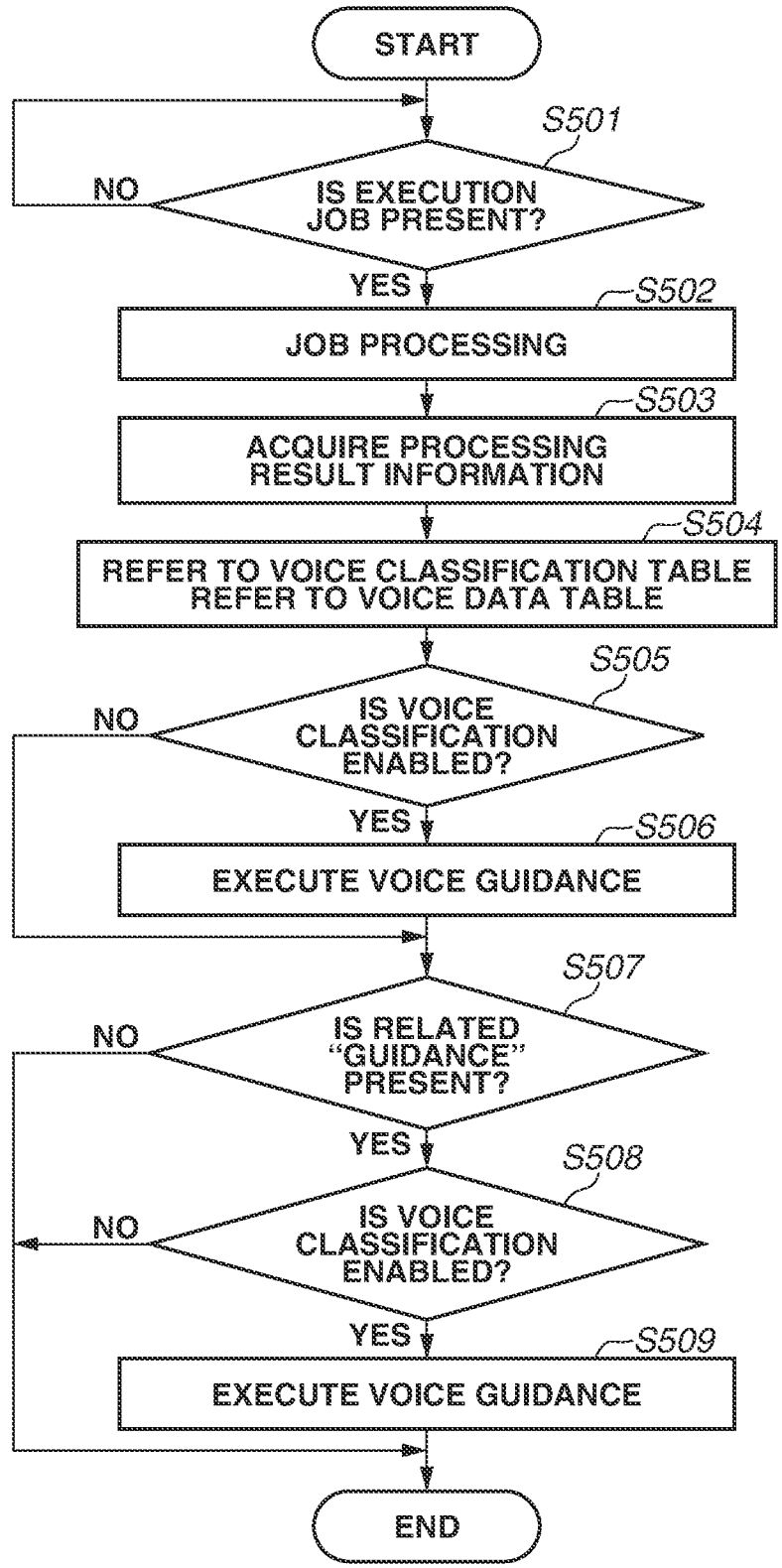
FIG. 5 is a flowchart illustrating processing contents of the image forming apparatus according to the first exemplary embodiment.

FIG. 5 is a flowchart illustrating the processing contents of voice guidance performed by the application 207 with reference to Tables A and B in accordance with the processing results of the image forming apparatus 100.

In step S501, the CPU 110 of the image forming apparatus 100 determines based on a copying or printing instruction from the user whether a job to be executed is generated. In a case where the determination is made in step S501 that the job is generated (YES in step S501), the processing proceeds step S502. In step S502, the CPU 110 of the image forming apparatus 100 executes the job of the function instructed by the user. Subsequently in step S503, the application 207 acquires information about a processing result of executing the job instructed by the user as the processing result ID 1101 from the CPU 110 of the image forming apparatus 100. In step S504, the application 207 refers to the voice classification table of Table A and the voice data table of Table B held in the HDD 116 for information about the processing result ID 1101 acquired in step S503.

For example, as a result of executing the print processing in the image forming apparatus 100, the application 207 acquires the notification of "2" in the processing result ID 1101 in Table A from the image forming apparatus 100. In this case, the processing result indicates "Toner out" in the processing type name 1104.

In step S505, the application 207 determines whether voice guidance corresponding to the voice classification is enabled or disabled in accordance with the acquired processing result.

For example, in Table A, as a result of the image forming apparatus 100 executing the print processing, the application 207 acquires the notification about "2" in the processing result ID 1101 from the image forming apparatus 100. In this case, the enable/disable flag 1105 indicates "1", and this means that the voice guidance corresponding to the voice classification is enabled.

In step S505, in a case where the application 207 determines that the voice guidance is enabled (YES in step S505), the processing proceeds to step S506. In step S506, the application 207 generates a voice from the speaker 103 via the voice I/F 114.

For example, in Table A, as a result of the image forming apparatus 100 executing the print processing, the application 207 acquires the notification of "2" in the processing result ID 1101 from the image forming apparatus 100. In this case, the voice classification 1102 indicates "Notification (occurrence of error)", the voice ID 1103 indicates "3", and the enable/disable flag 1105 indicates "1 (enable)". The application 207 refers to the voice data table of Table B for a voice corresponding to "3" in the voice ID 1103. In table B, the voice data 1202 relating to "3" in the voice ID 1201 indicates "Toner is depleted", and thus the application 207 generates the voice "Toner is depleted" from the speaker 103 via the voice I/F 114 for the notification to the user.

In step S507, the application 207 determines whether any ID related to the voice data 1202 notified in step S506 is present in the related voice ID 1203. In a case where any ID is present in the related voice ID 1203 (YES in step S507), the processing proceeds to step S508. In step S508, the application 207 refers to the voice classification table of Table A for the enable/disable flag 1105 related to the voice ID 1103, based on the related voice ID 1203, and determines whether the voice guidance corresponding to the voice classification is enabled or disabled. In step S508, in a case where the application 207 determines that the voice guidance is enabled (YES in step S508), the processing proceeds to step S509. In step S509, the application 207 generates the voice form the speaker 103 via the voice I/F 114, and ends the processing.

For example, in table B, the related voice ID 1203 corresponding to "3" in the voice ID 1201 indicates "5". In Table A, the enable/disable flag 1105 related to "5" in the voice ID 1103 is "1 (enable)". Further, in Table B, the voice data 1202 of "5" in the voice ID 1201 is "Shake the toner bottle and replenish toner through the insertion opening". Accordingly, the application 207 generates the voice "Shake the toner bottle and replenish toner through the insertion opening" from the speaker 103 via the voice I/F 114 for notification to the user.

As described above, the present exemplary embodiment makes it possible to individually specify the setting for giving the user a voice notification that the image forming apparatus 100 has normally operated and the setting for giving the user a voice notification about occurrence of an error in the image forming apparatus 100. This creates an effect that voice guidance desired by the user can be set.

Further, the present exemplary embodiment prompts the user to set voice guidance regarding a method for removing an error if the error occurs in the image forming apparatus 100. This creates an effect that voice guidance for solving an issue of the user can be easily provided.

The first exemplary embodiment has described the example where the voice data table of Table B is directly used, but the contents of voice guidance desired to be provided varies depending on users. A second exemplary embodiment, therefore, describes processing for editing the contents of voice data.

Figure 6A:
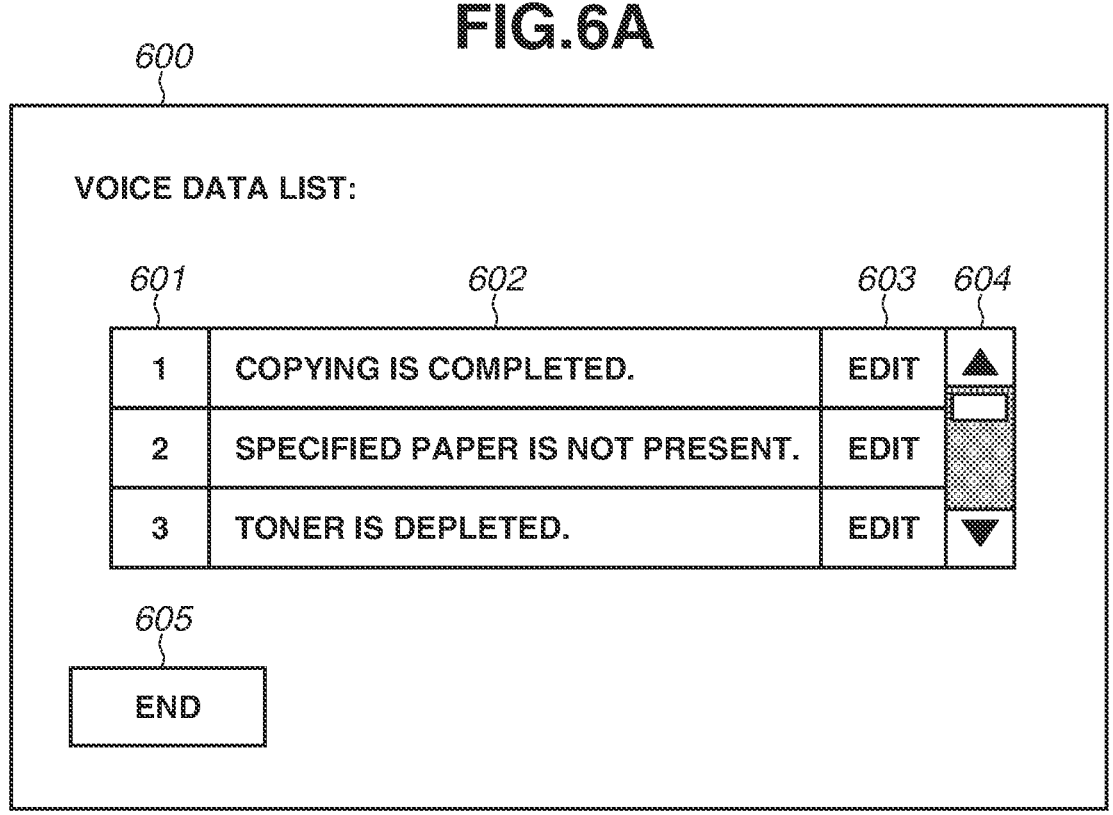
FIGS. 6A and 6B are diagrams illustrating user interfaces of the image forming apparatus according to a second exemplary embodiment.
Figure 6B:
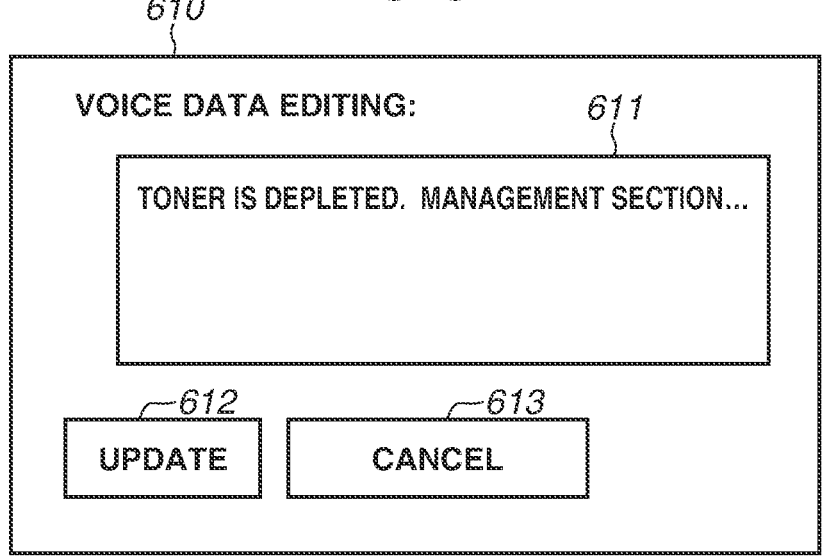

FIGS. 6A and 6B are diagrams illustrating examples of user interfaces for editing voice data to be displayed on the operation unit 102 by running the application 207 of the image forming apparatus 100 according to the present exemplary embodiment. A voice data editing screen 600 is displayed on the operation unit 102, and a voice data editing instruction is accepted from a user.

A voice ID 601 is for identifying voice data corresponding to the voice ID 1103 in Table A and the voice ID 1201 in Table B. A voice data 602 corresponds to the voice data 1202 in Table B. An edit button 603 is for editing a line of the voice data 602 desired to be edited by the user. The application 207 detects via the operation unit 102 that the edit button 603 is presses down, and displays a voice data editing dialogue 610. A scroll bar 604 is for making it possible to scroll to display a list of voice data in a case where the number of pieces of voice data is large. The application 207 detects via the operation unit 102 that an end button 605 is pressed down, and ends the processing. A voice data editing screen 611 of the voice data editing dialogue 610 makes it possible to edit the voice data 602 corresponding to the line of the edit button 603 by an operation of a keyboard (not illustrated). An update button 612 is for updating the edited voice data 602, and the application 207 updates the contents of the voice data table in Table B to save the updated contents in the HDD 116. A cancel button 613 is for cancelling the edited content and not to save the contents.

As a result, in a case where desired contents of voice guidance vary depending on individual users, the contents of the voice guidance can be edited. Thus, the voice guidance desired by users can be provided.

The first exemplary embodiment has described the processing for prompting a user to enable the "Guidance for error solution (305)" when "Notification at occurrence of error (305)" is set to be enabled in the example of FIG. 4. Alternatively, in a third exemplary embodiment, processing for prompting a user to enable "Notification at occurrence of error (303)" may be executed when "Guidance for error solution (305)" is set to be enabled first.

The present disclosure includes an apparatus or a system configured by suitably combining the above-described exemplary embodiments, and a method.

Here, the present disclosure includes an apparatus or a system that executes one or more pieces of software (programs) that achieve the above-described functions according to the exemplary embodiments. The present disclosure further includes the method for achieving the above exemplary embodiments to be executed on the apparatus or the system. Further, the program is provided to the system or the apparatus via a network or various storage media, and is read and executed by one or more computers (CPUs or micro processing units (MPUs)) of the system or the apparatus. That is, the present disclosure also includes the program itself or various storage media storing the program readable by a computer. Further, the present disclosure can be achieved also by a circuit (for example, application-specific integrated circuit (ASIC)) that achieves the functions of the above-described exemplary embodiments.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-051121, filed Mar. 28, 2022, which is hereby incorporated by reference herein in its entirety.

What is claimed is:

1. An image forming apparatus having a voice notification function of giving a voice notification to a user, the apparatus comprising:
a first setting unit configured to set whether to enable the voice notification function of notifying the user of an operation result of the image forming apparatus in a case where the operation result is normal; and
a second setting unit configured to set whether to enable the voice notification function relating to the operation result of the image forming apparatus in a case where the operation result is an error.

2. The image forming apparatus according to claim 1, further comprising a third setting unit configured to set whether to enable the voice notification function of notifying the user of an operating procedure of the image forming apparatus in the case where the operation result of the image forming apparatus is an error.

3. The image forming apparatus according to claim 1, further comprising a third setting unit configured to set whether to enable the voice notification function of notifying the user of an operating procedure of the image forming apparatus in the case where the operation result of the image forming apparatus is normal.

4. The image forming apparatus according to claim 1, further comprising a first providing unit configured to provide a selection screen for selecting whether to enable the voice notification function of notifying the user of an operating procedure of the image forming apparatus in a case where the setting made by the second setting unit is enabled.

5. The image forming apparatus according to claim 1, further comprising a second providing unit configured to provide an editing screen for a user to edit a content of a voice notified by the voice notification function.

6. A method for controlling an image forming apparatus having a voice notification function of giving a voice notification to a user, the method comprising:
setting whether to enable the voice notification function of notifying the user of an operation result of the image forming apparatus in a case where the operation result is normal; and
setting whether to enable the voice notification function relating to the operation result of the image forming apparatus in a case where the operation result is an error.

7. A non-transitory computer-readable storage medium storing a program that executes a method for controlling an image forming apparatus having a voice notification function of giving a voice notification to a user, the method comprising:
setting whether to enable the voice notification function of notifying the user of an operation result of the image forming apparatus in a case where the operation result is normal; and
setting whether to enable the voice notification function relating to the operation result of the image forming apparatus in a case where the operation result is an error.

* * * * *